(12) United States Patent
Miyake et al.

(10) Patent No.: US 10,894,303 B2
(45) Date of Patent: Jan. 19, 2021

(54) FASTENING METHOD

(71) Applicant: TOYOTA JIDOSHA KABUSHIKI KAISHA, Toyota (JP)

(72) Inventors: Hirota Miyake, Toyota (JP); Yuji Nabeshima, Ama (JP); Koji Kawasaka, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/418,295

(22) Filed: May 21, 2019

(65) Prior Publication Data
US 2020/0001412 A1    Jan. 2, 2020

(30) Foreign Application Priority Data

Jun. 27, 2018  (JP) .................................. 2018-121548

(51) Int. Cl.
| | | |
|---|---|---|
| *B23P 19/00* | (2006.01) | |
| *B23P 19/12* | (2006.01) | |
| *B23P 19/06* | (2006.01) | |
| *B25B 23/06* | (2006.01) | |
| *B23Q 7/10* | (2006.01) | |

(52) U.S. Cl.
CPC ........... *B23P 19/006* (2013.01); *B23P 19/002* (2013.01); *B23P 19/004* (2013.01); *B23P 19/069* (2013.01); *B23P 19/12* (2013.01); *B23Q 7/10* (2013.01); *B25B 23/06* (2013.01); *B25B 23/065* (2013.01); *Y10T 29/535* (2015.01); *Y10T 29/53478* (2015.01); *Y10T 29/53483* (2015.01); *Y10T 29/53487* (2015.01)

(58) Field of Classification Search
CPC ..... B23P 19/006; B23P 19/004; B23P 19/069; B23P 19/12; B23P 19/002; Y10T 29/53478; Y10T 29/53483; Y10T 29/53487; Y10T 29/535; B23Q 7/10; B25B 23/06; B25B 23/065
See application file for complete search history.

(56) References Cited

U.S. PATENT DOCUMENTS

| | | | | |
|---|---|---|---|---|
| 4,241,773 A | * | 12/1980 | Personnat ................. | B25F 1/00 206/373 |
| 4,653,356 A | * | 3/1987 | Golden .............. | B23Q 3/15533 81/177.4 |

(Continued)

FOREIGN PATENT DOCUMENTS

| | | |
|---|---|---|
| JP | 2010-142888 | 7/2010 |
| JP | 2010-280008 | 12/2010 |

*Primary Examiner* — Jermie E Cozart
(74) *Attorney, Agent, or Firm* — Oblon, McClelland, Maier & Neustadt, L.L.P.

(57) ABSTRACT

This fastening method is a method for fastening a plurality of types of fastening members stored in a cartridge, the cartridge includes a plurality of attachments, the attachment has one end in which a first fitting part that fits to a fastening force receiving part of a corresponding fastening member of the plurality of types of fastening members is formed and another end in which a second fitting part that fits to a fastening force working part of the fastening means is formed, and the cartridge is supplied in a state in which the plurality of types of fastening members and the plurality of attachments are arranged based on the order of fastening the plurality of types of fastening members to the object to be fastened.

10 Claims, 9 Drawing Sheets

(56) References Cited

U.S. PATENT DOCUMENTS

| | | | | |
|---|---|---|---|---|
| 4,936,169 | A | * | 6/1990 | Parsons ................. B25B 23/045 81/177.4 |
| 5,445,641 | A | * | 8/1995 | Frigg ................. A61B 17/1735 221/113 |
| 5,893,685 | A | * | 4/1999 | Olson ..................... B25F 5/029 408/124 |
| 7,677,328 | B2 | * | 3/2010 | Chin ....................... A45D 29/05 173/216 |
| 2002/0184978 | A1 | * | 12/2002 | Goodhue ............... B25B 23/06 81/433 |
| 2006/0048366 | A1 | * | 3/2006 | Goodhue .............. B25B 23/045 29/428 |
| 2009/0308207 | A1 | * | 12/2009 | Goodhue .............. B25B 23/045 81/57.37 |
| 2010/0107721 | A1 | * | 5/2010 | Kerner ................. B25B 27/146 72/424 |
| 2011/0245052 | A1 | | 10/2011 | Ohno et al. |
| 2014/0018817 | A1 | * | 1/2014 | Watt ........................ B25B 23/10 606/104 |

* cited by examiner

FASTENING METHOD

CROSS REFERENCE TO RELATED APPLICATIONS

This application is based upon and claims the benefit of priority from Japanese patent application No. 2018-121548, filed on Jun. 27, 2018, the disclosure of which is incorporated herein in its entirety by reference.

BACKGROUND

The present disclosure relates to a fastening method.

A cartridge for storing fastening members such as bolts or nuts that fasten two or more members has been known. Japanese Unexamined Patent Application Publication No. 2010-280008 discloses a device for causing a plurality of types of fastening members (fastening member filling device) to be stored in a cartridge (magazine) that includes a plurality of respective attachments (heads) for holding a plurality of types of fastening members.

SUMMARY

There are many cases where a difference in shapes of fastening members cannot be known at a glance even though types of the fastening members are different from one another. Therefore, when fastening work is carried out using a cartridge that stores a plurality of types of fastening members as described above, for example, it takes time for an operator to select the fastening member that should be fastened at a predetermined position in an object to be fastened since he/she cannot immediately select the appropriate fastening member, which causes the operation efficiency to be degraded.

The present disclosure has been made in view of the aforementioned background and aims to provide a fastening method capable of reducing degradation in the operation efficiency when fastening work is performed using a cartridge that stores a plurality of types of fastening members.

The present disclosure provides a fastening method for fastening a plurality of types of fastening members stored in a cartridge at respective predetermined positions in an object to be fastened by rotating the cartridge around a rotation axis of the fastening members by fastening means, in which the cartridge includes a plurality of attachments for holding the plurality of types of respective fastening members, each of the attachments has one end in the direction of the rotation axis in which a first fitting part that fits to a fastening force receiving part of a corresponding fastening member of the plurality of types of fastening members is formed and another end in the direction of the rotation axis in which a second fitting part that fits to a fastening force working part of the fastening means is formed, when the attachment is rotated by the fastening means in which the fastening force working part is fit to the second fitting part, the corresponding fastening member in which the fastening force receiving part is fit to the first fitting part rotates along with the rotation of the attachment, and the cartridge is supplied in a state in which the plurality of types of fastening members and the plurality of attachments are arranged based on the order of fastening the plurality of types of fastening members to the object to be fastened.

The order of fastening the plurality of types of fastening members 10 to the object to be fastened is made to coincide with the order of alignment of the storage spaces in the cartridge 2. When the fastening members 10 are arranged in the cartridge 2 as described above, the operator does not need to find the fastening members that should be fastened at the predetermined positions of the object to be fastened, whereby it is possible to improve the operation efficiency in the fastening work.

Further, the cartridge may have a columnar shape and the plurality of types of fastening members may be arranged on the same circumference in an order from the one whose order of fastening is early to the one whose order of fastening is late in the cartridge. According to this structure, it is sufficient for the operator to fasten the fastening members arranged in the cartridge on the same circumference in the order in which they are aligned, whereby it is possible to improve the operation efficiency in the fastening work.

Further, the order of fastening may be determined depending on the type of the vehicle in manufacturing of the vehicle. In the manufacturing of vehicles, the number of fastening members that need to be fastened is large and the number of types of the fastening members that are used is large as well. Therefore, if the operator needs to find the fastening members that correspond to the fastening positions in the vehicle from among the plurality of types of fastening members stored in the cartridge, the burden on the operator increases. Further, there are a large number of types of the vehicles to be manufactured. Therefore, even when the operator can promptly find the fastening members that correspond to the fastening positions in a certain type of vehicle, if there is a change in the type of the vehicle to be manufactured, it still takes time for the operator to find the fastening members that correspond to the fastening positions in the vehicle. By determining the order of fastening depending on the type of the vehicle in the manufacturing of the vehicle, even when the type of the vehicle to be manufactured is changed, it is possible for the operator to efficiently perform the fastening work.

Further, regarding the order of fastening of the fastening members, the fastening members whose lengths in the direction of the rotation axis are equal to or larger than the predetermined length may be prioritized over the fastening members whose lengths in the direction of the rotation axis are smaller than the predetermined length. It is possible that the fastening members whose lengths in the direction of the rotation axis are a predetermined length or more may contact the object to be fastened when the cartridge is moved. Therefore, when the order of fastening the fastening members whose lengths in the direction of the rotation axis are a predetermined length or more is made late, the period in which the operator must be careful not to cause the fastening members to hit the object to be fastened increases when the cartridge is moved in the fastening work, which may cause the operation efficiency to be degraded. When the order of fastening is determined, the fastening members whose lengths in the direction of the rotation axis are equal to or larger than the predetermined length are prioritized over the fastening members whose lengths in the direction of the rotation axis are smaller than the predetermined length, whereby it is possible to complete fastening of the fastening members whose lengths are equal to or larger than the predetermined length as soon as possible. Accordingly, the period in which the operator needs to carefully move the cartridge 2 in the fastening work can be reduced, whereby it is possible to improve the operation efficiency.

Further, an attachment of the plurality of attachments for holding the fastening member whose length in the direction of the rotation axis is equal to or larger than the predetermined length may be provided with a supporting part that is extended in the direction of the rotation axis in an outer periphery of the fastening member and supports the fastening member. According to this structure, it becomes possible to reduce the probability that the fastening member may drop off from the attachment when the cartridge is moved.

According to the present disclosure, it is possible to reduce degradation in the operation efficiency when fastening work is performed using a cartridge that stores a plurality of types of fastening members.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, although the present disclosure will be described with reference to an embodiment of the disclosure, the disclosure according to claims is not limited to the following embodiment. Moreover, all the components described in the following embodiment are not necessarily indispensable for means to solve problems. For the sake of clarification of the description, the following description and the drawings are omitted and simplified as appropriate. Throughout the drawings, the same components are denoted by the same reference symbols and overlapping descriptions are omitted as necessary.

A fastening method according to this embodiment is a method of fastening a plurality of types of fastening members stored in a cartridge at respective predetermined positions in an object to be fastened by rotating the cartridge around a rotation axis of the fastening members by fastening means.

Figure 1:
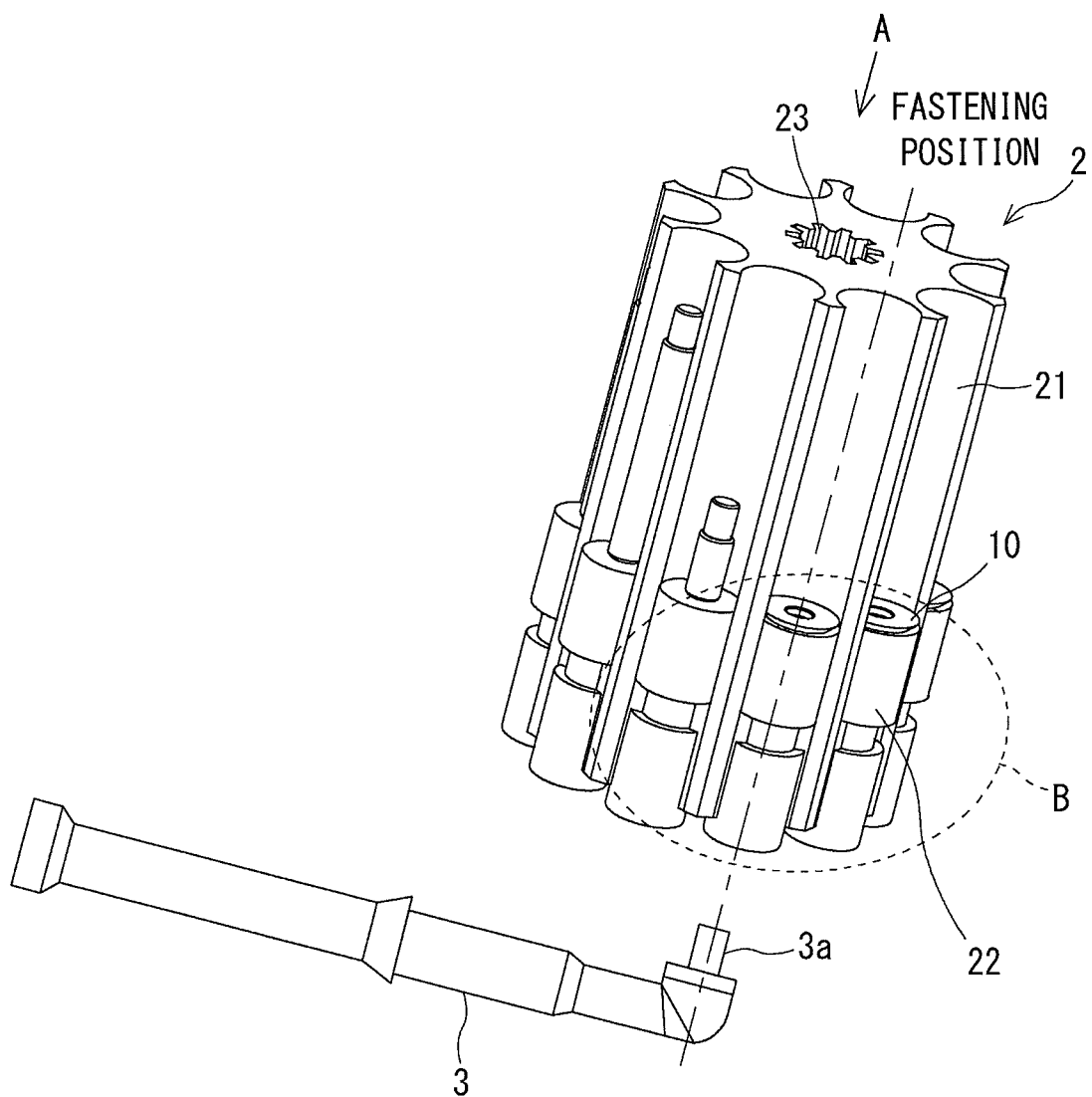
FIG. 1 is a schematic view showing one example of a configuration of a cartridge used in a fastening method according to an embodiment.
Figure 2:
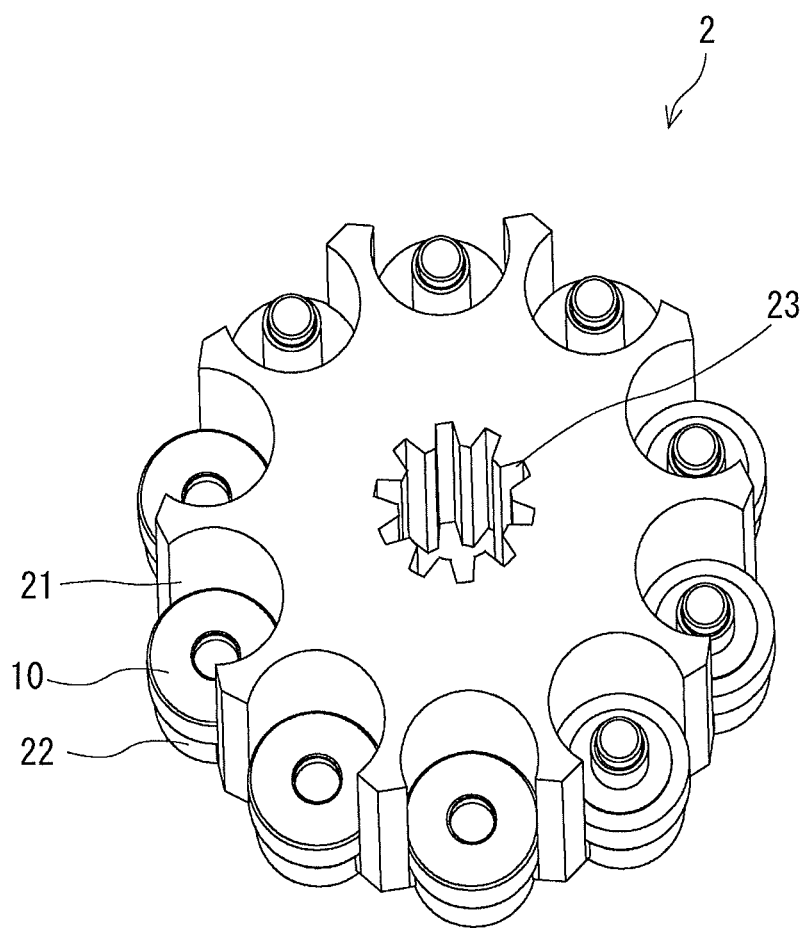
FIG. 2 is an arrow view seen from the direction of an arrow A in FIG. 1.

Referring first to FIGS. 1 and 2, a configuration of a cartridge to be used in the fastening method according to this embodiment will be explained. FIG. 1 is a schematic view showing one example of a configuration of a cartridge 2 used in the fastening method according to this embodiment. FIG. 2 is an arrow view seen from the direction of an arrow A in FIG. 1. As shown in FIGS. 1 and 2, the cartridge 2 includes a plurality of attachments 22 holding a plurality of types of respective fastening members 10.

The cartridge 2 has, for example, a columnar shape and includes a plurality of storage spaces 21 formed therein on the same circumference. In the cartridge 2, the plurality of attachments 22 are arranged in the plurality of respective storage spaces 21. At the center of the circumference, a spline hole 23 fit to a spline shaft that will be explained later is formed in the cartridge 2. The cartridge 2 is formed of, for example, an elastic material such as a resin.

Figure 3:
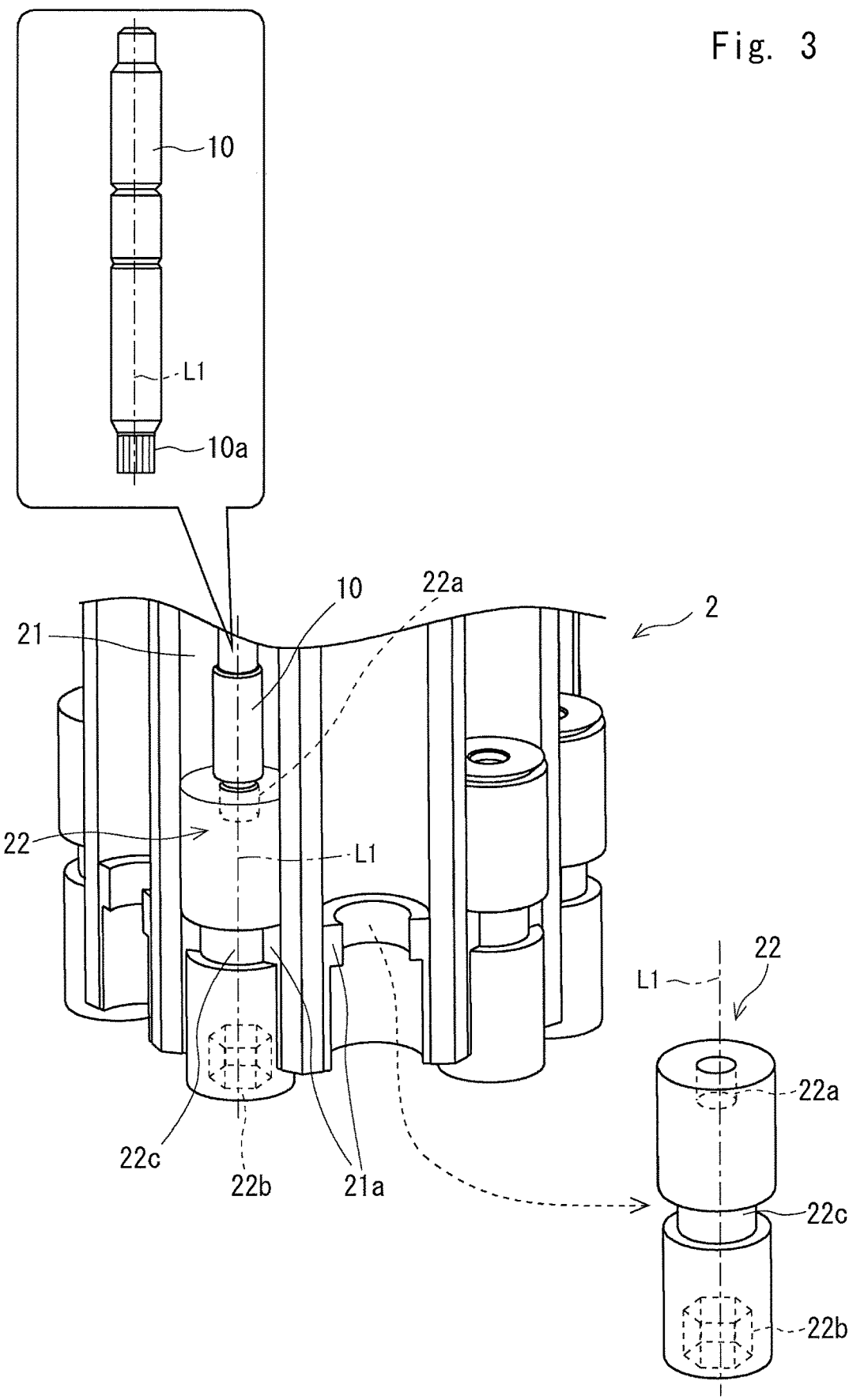
FIG. 3 is an enlarged view in which an area B surrounded by a dashed line in FIG. 1 is enlarged.

FIG. 3 is an enlarged view in which an area B surrounded by a dashed line in FIG. 1 is enlarged. As shown in FIG. 3, the attachment 22 is made of, for example, a material such as a resin that can be easily molded as a single piece having a columnar shape. The attachment 22 has one end in the direction of a rotation axis L1 in which a first fitting part 22a that is fit to a fastening force receiving part 10a of the corresponding fastening member 10 of the plurality of types of fastening members 10 is formed. A magnet may be arranged in the attachment 22 so that a magnetic force is applied to the first fitting part 22a. According to this structure, the fastening force receiving part 10a of the fastening member 10 is attracted to the first fitting part 22a by the magnetic force, whereby it is possible to prevent the fastening member 10 from falling off from the cartridge 2 when the cartridge 2 is moved.

Further, in the other end of the attachment 22 in the direction of the rotation axis L1, a second fitting part 22b fit to a fastening force working part 3a of fastening means 3 (see FIG. 1) is formed. The attachment 22 is configured in such a way that, when the attachment 22 is rotated around the rotation axis L1 by the fastening means 3 in which the fastening force working part 3a is fit to the second fitting part 22b, the corresponding fastening member 10 in which the fastening force receiving part 10a is fit to the first fitting part 22a rotates along with the rotation of the attachment. In this embodiment, the attachment 22 is formed as a single piece having a columnar shape. Therefore, when the second fitting part 22b of the other end of the column is rotated about the rotation axis L1, the first fitting part 22a of one end of the column is also naturally rotated along with the rotation of the second fitting part 22b.

A circumferential groove 22c is formed in the outer periphery of the attachment 22 in the position between one end and the other end of the attachment 22. An arc-shaped projection 21a that fits to the circumferential groove 22c formed in the attachment 22 is formed on a wall surface of the cartridge 2 that forms the storage space 21. That is, when the attachment 22 is stored in the storage space 21 of the cartridge 2, the circumferential groove 22c of the attachment 22 and the arc-shaped projection 21a formed on the wall surface that forms the storage space 21 are fit to each other in such a way that they can be slid relative to each other. Therefore, it is also possible to rotate the attachment 22 in the storage space 21 of the cartridge 2.

A part of the wall surface that forms the storage space 21 on the side of the outer periphery of the cartridge 2 is cut away. The attachment 22 can be attached to or detected from the cartridge 2 from this cut-away part. Since the cartridge 2 is formed of an elastic material such as a resin, the cut-away part of the wall surface that forms the storage space 21 is extended when the attachment 22 is attached to or detached from the cartridge 2. The operator removes the attachment 22 in which the fastening member 10 is held from the cartridge 2 when the fastening member 10 is fastened using the fastening means 3.

Figure 4:
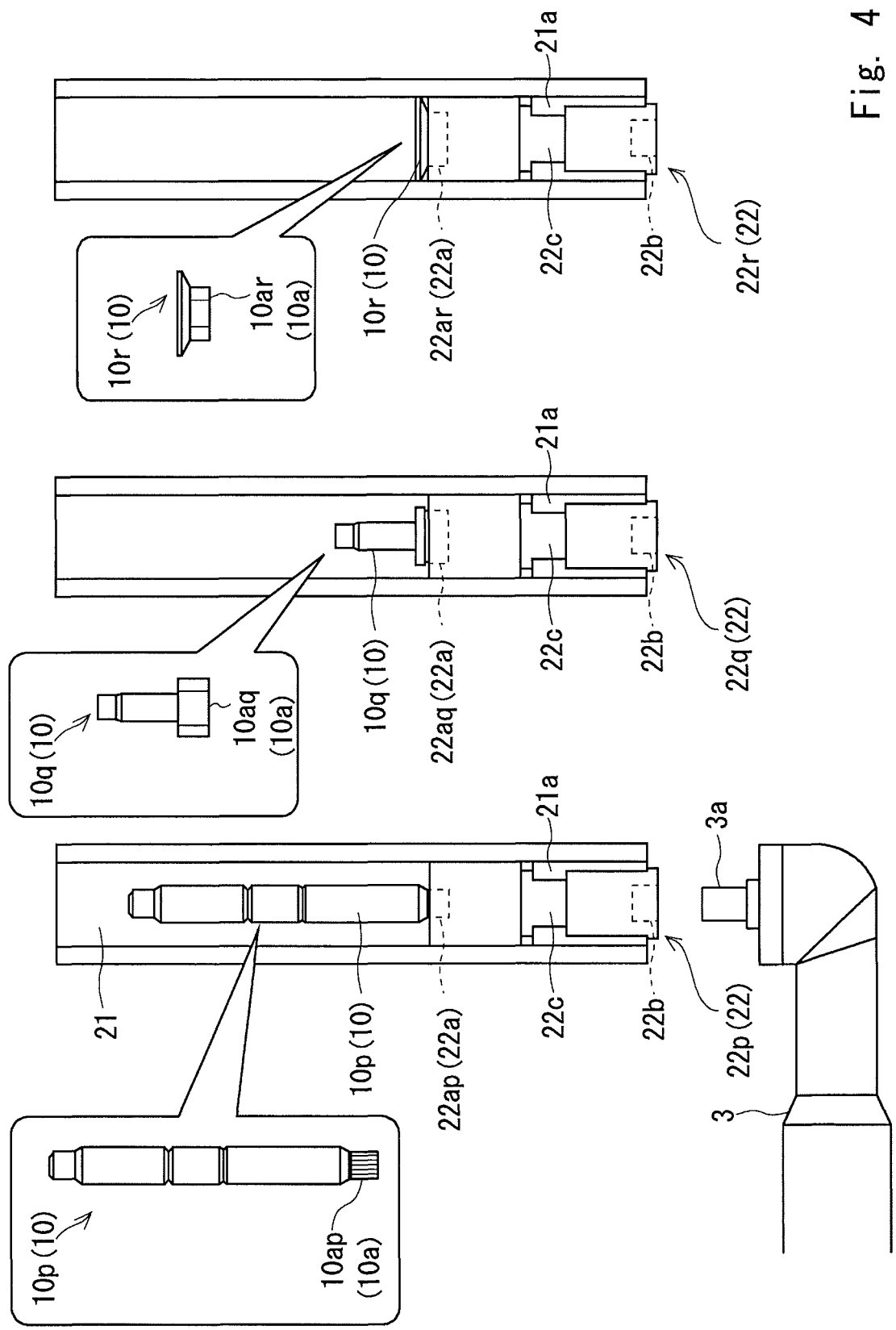
FIG. 4 is a schematic view showing a state in which a plurality of types of fastening members are held via respective corresponding attachments in storage spaces of a cartridge.

As described above, the cartridge 2 holds the plurality of types of fastening members 10 via the plurality of attachments 22. The fastening member 10 is a member such as a bolt or a nut for fastening two or more members. FIG. 4 is a schematic view showing a state in which the plurality of types of fastening members 10 (10p, 10q, and 10r) are respectively held via the attachments 22 (22p, 22q, and 22r) in the storage spaces 21 of the cartridge 2. As shown in FIG. 4, the fastening member 10p is a stud bolt, the fastening member 10q is a general-purpose bolt, and the fastening member 10r is a general-purpose nut. The fastening force receiving parts 10a (10ap, 10aq, and 10ar) in the fastening members 10p, 10q, and 10r have shapes different from one another. Therefore, the respective first fitting parts 22a (22ap, 22aq, and 22ar) in the attachments 22p, 22q, and 22r need to be formed in such a way that they are fit to the fastening force receiving parts 10ap, 10aq, and 10ar, respectively. On the other hand, the second fitting parts 22b in the attachments 22p, 22q, and 22r have a common shape since they are fit to the fastening force working part 3a of the fastening means 3.

Next, a rotation mechanism for rotating the cartridge 2 about the spline hole 23 (see FIG. 1) will be explained.

Figure 5:
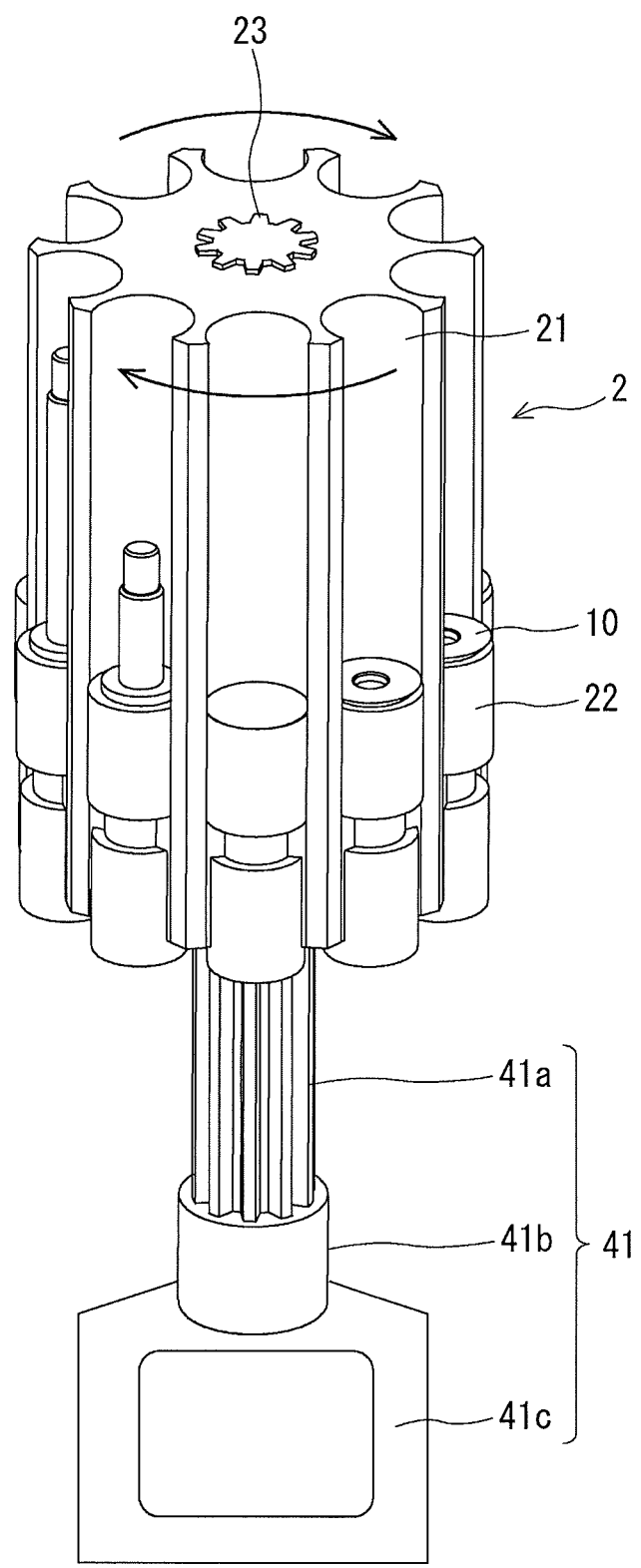
FIG. 5 is a schematic view for describing a rotation mechanism to rotate the cartridge around a spline hole.

FIG. 5 is a schematic view illustrating a rotation mechanism 41 for rotating the cartridge 2 about the spline hole 23. As shown in FIG. 5, the rotation mechanism 41 includes a spline shaft 41a that fits to the spline hole 23 of the cartridge 2, a rotation part 41b for rotating the spline shaft 41a, and a handle 41c coupled to the rotation part 41b. The operator holds the handle 41c and rotates the cartridge 2 by his/her hand, whereby it is possible to change the storage space 21 which is located in front of the operator among the plurality of storage spaces 21 in the cartridge 2. The operator performs fastening work using the fastening means 3 on the fastening member 10 held in the storage space 21 located in front of the operator. The cartridge 2 can be rotated by the rotation part 41b, whereby it is possible to efficiently perform the fastening work.

Next, the order of storing the plurality of types of fastening members 10 in the plurality of storage spaces 21 in the cartridge 2 will be explained.

Figure 6:
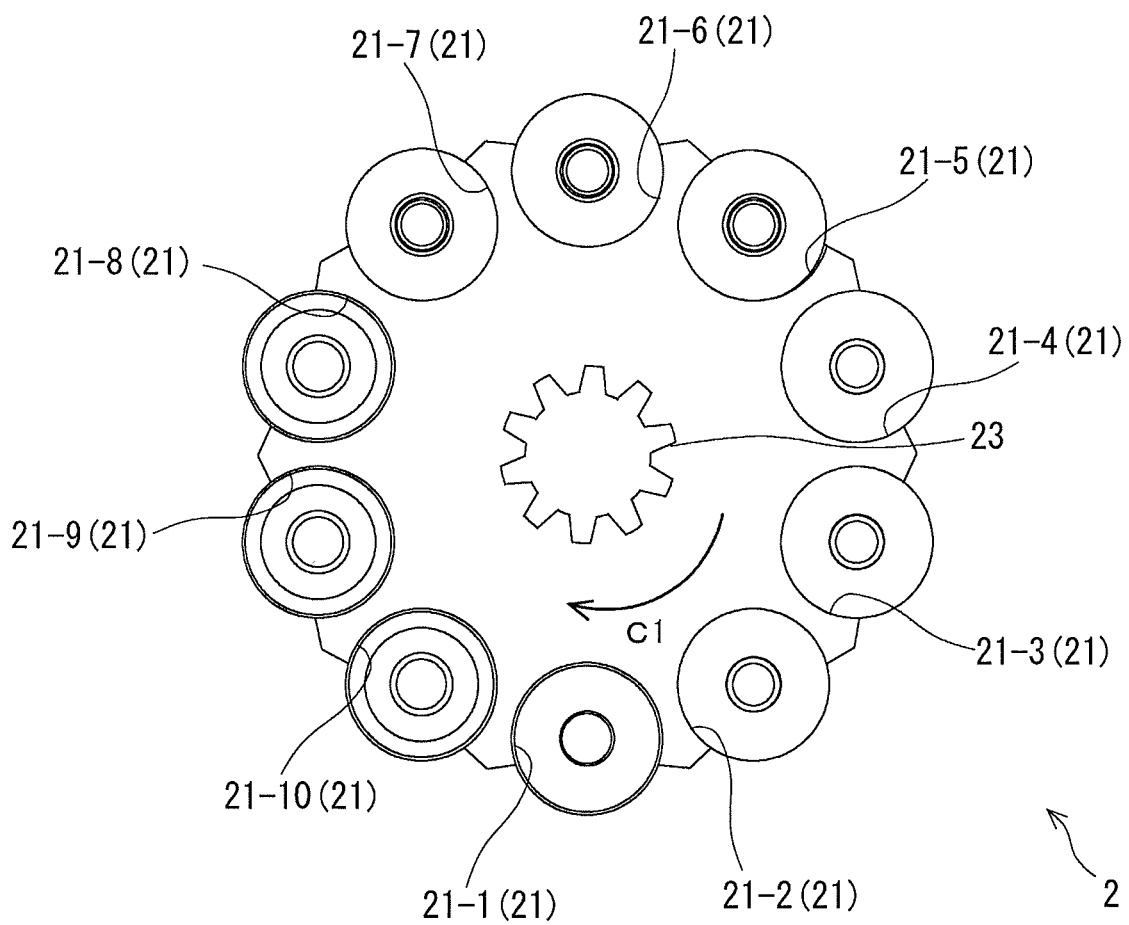
FIG. 6 is a schematic view for describing an order for storing a plurality of types of fastening members in a plurality of storage spaces in the cartridge.

FIG. 6 is a schematic view for describing the order of storing the plurality of types of fastening members 10 in the plurality of storage spaces 21 in the cartridge 2. As shown in FIG. 6, in the plurality of storage spaces 21 in the cartridge 2, the storage space that is located in front of the operator P in the initial state is denoted by a storage space 21-1, and the following storage spaces are represented by storage spaces 21-2 to 21-10 in the counterclockwise direction. When the operator P rotates the cartridge 2 in the clockwise direction by the aforementioned rotation mechanism 41 (see FIG. 5), the storage space that is located in front of the operator P is sequentially changed from the storage space 21-1 to the storage spaces 21-2, . . . 21-9, and 21-10 in this order. The rotation mechanism 41 may include a ratchet mechanism for limiting the rotational direction to one direction C1 (in this example, the clockwise direction).

In the fastening work for fastening the plurality of types of fastening members 10 to the object to be fastened, the cartridge 2 is supplied in the state in which the plurality of types of fastening members and the plurality of attachments are arranged based on the order of fastening the plurality of types of fastening members 10 to the object to be fastened. In the cartridge 2, the plurality of types of fastening members 10 are preferably arranged in order from the one whose order of fastening is early to the one whose order of fastening is late on the same circumference. That is, the plurality of types of fastening members 10 are stored in the respective storage spaces in such a way that the order of fastening the plurality of types of fastening members 10 to the object to be fastened coincides with the order of the alignment of the storage spaces in the cartridge 2. That is, for example, the first fastening member 10, which is to be fastened first, is stored in the storage space 21-1, and the next fastening member 10, which is to be fastened next, is stored in the storage space 21-2. When the fastening members 10 are arranged in the cartridge 2 as described above, the operator does not need to find the fastening members that should be fastened at the predetermined positions of the object to be fastened, whereby it is possible to improve the operation efficiency in the fastening work.

Regarding the order of fastening the plurality of types of fastening members 10 to the object to be fastened, the fastening members whose lengths in the direction of the rotation axis are equal to or larger than a predetermined length may be prioritized over the fastening members whose lengths in the direction of the rotation axis are smaller than the predetermined length. For example, the fastening members whose lengths in the direction of the rotation axis are equal to or larger than the predetermined length are stored in positions such as the storage spaces 21-1 and 21-2 whose alignment order is early.

It is possible, for example, that the fastening members 10 whose lengths in the direction of the rotation axis are a predetermined length or more may contact the object to be fastened when the cartridge 2 is moved, as shown in the fastening member 10p (stud bolt) in FIG. 4. Therefore, when the order of fastening the fastening members 10 whose lengths in the direction of the rotation axis are a predetermined length or more is made late, the period in which the operator must be careful not to cause the fastening members 10 to hit the object to be fastened increases when the cartridge 2 is moved in the fastening work, which may cause the operation efficiency to be degraded. When the order of fastening is determined, the fastening members whose lengths in the direction of the rotation axis are equal to or larger than the predetermined length are prioritized over the fastening members whose lengths in the direction of the rotation axis are smaller than the predetermined length, whereby it is possible to complete fastening of the fastening members whose lengths are equal to or larger than the predetermined length as soon as possible. Accordingly, the period in which the operator needs to carefully move the cartridge 2 in the fastening work can be reduced, whereby it is possible to improve the operation efficiency. The predetermined length is determined as appropriate in view of the operation efficiency and the like.

Further, when the fastening method according to this embodiment is applied to the manufacturing of the vehicle, the order of fastening may be determined depending on the type of the vehicle. In the manufacturing of the vehicles, the number of fastening members 10 that need to be fastened is large and the number of types of the fastening members 10 that are used is large as well. Therefore, if the operator needs to find the fastening members 10 that correspond to the fastening positions in the vehicle from among the plurality of types of fastening members 10 stored in the cartridge 2, the burden on the operator increases. Further, there are a large number of types of the vehicles to be manufactured. Therefore, even when the operator can promptly find the fastening members 10 that correspond to the fastening positions in a certain type of vehicle, if there is a change in the type of the vehicle to be manufactured, it still takes time for the operator to find the fastening members 10 that correspond to the fastening positions in the vehicle. By determining the order of fastening depending on the type of the vehicle in the manufacturing of the vehicle, even when the type of the vehicle to be manufactured is changed, it is possible for the operator to efficiently perform the fastening work.

Next, a flow of processing in the fastening work process will be explained below. In the following description, reference is made also to FIG. 1.

Figure 7:
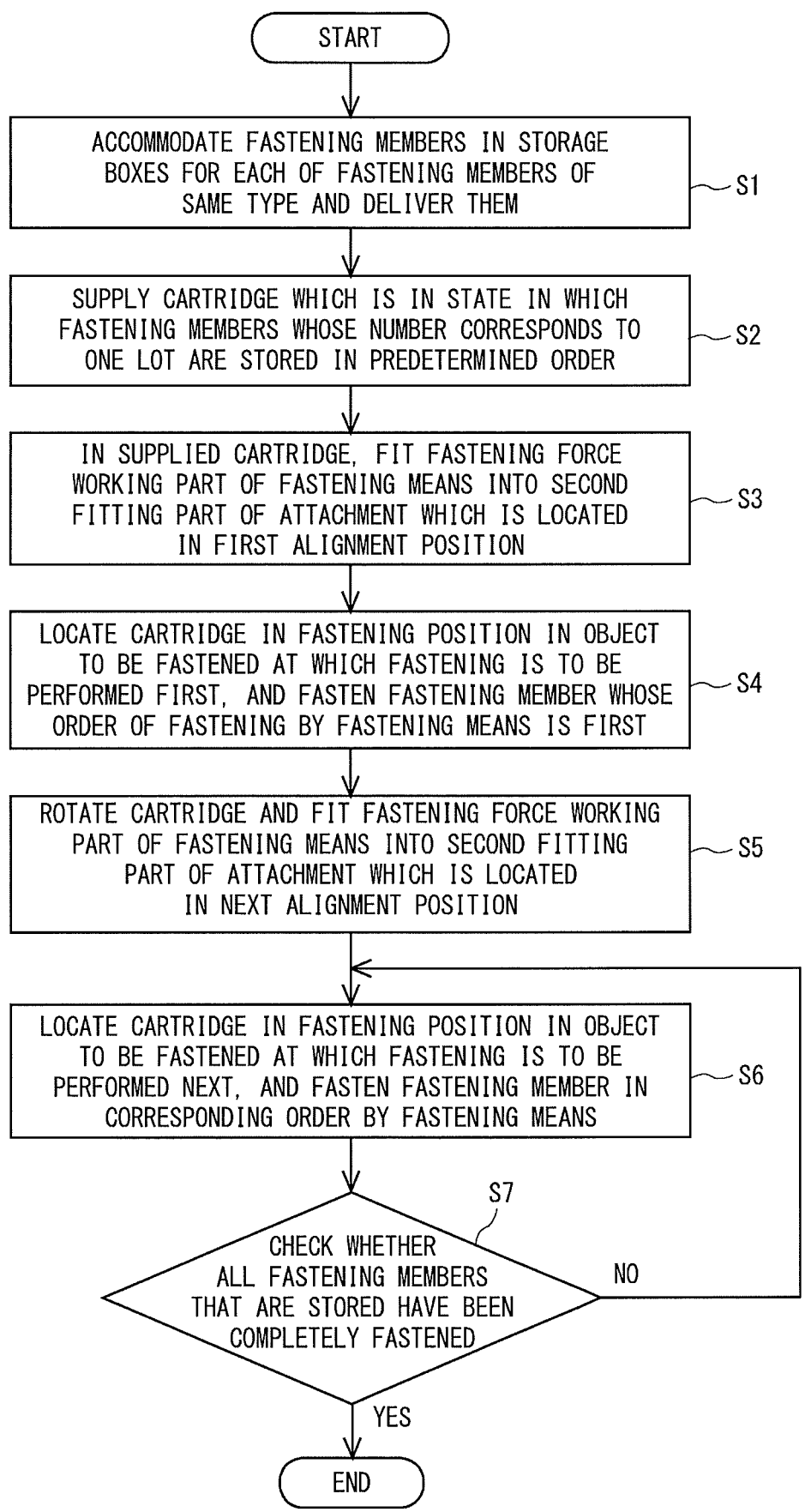
FIG. 7 is a flowchart showing a flow of processing of a fastening work process.

FIG. 7 is a flowchart showing a flow of the processing in the fastening work process. As shown in FIG. 7, first, the fastening members 10 are accommodated in storage boxes for each of the respective fastening members 10 of the same type (the same shape) and are delivered (Step S1). Next, the fastening members 10 whose number corresponds to one lot are selected from each of the storage boxes and these fastening members 10 are stored in the cartridge 2 in the predetermined order, and the cartridge 2 which is in the state in which the fastening members 10 are stored in the predetermined order is supplied (Step S2).

After Step S2, in the supplied cartridge 2, the fastening force working part 3a of the fastening means 3 is fitted into the second fitting part 22b of the attachment 22 which is located in the first alignment position (Step S3). Next, the cartridge 2 is located in the fastening position in the object to be fastened at which the fastening is to be performed first, and the fastening member 10 whose order of fastening by the fastening means 3 is the first is fastened (Step S4).

Next, the cartridge 2 is rotated, and the fastening force working part 3a of the fastening means 3 is fitted into the second fitting part 22b of the attachment 22 which is located in the next alignment position (Step S5). Next, the cartridge 2 is located in the fastening position in the object to be fastened at which the fastening is to be performed next, and the fastening member 10 in the corresponding order is fastened by the fastening means 3 (Step S6).

After Step S6, it is checked whether all the fastening members 10 that are stored have been completely fastened (Step S7). When it is confirmed in Step S7 that all the fastening members 10 that are stored have been completely fastened (YES), the process ends. When all the fastening members 10 that are stored have not been completely fastened in Step S7 (NO), the processing is made back to Step S5.

Modified Example 1

As shown in FIG. 4, as the length in the direction of the rotation axis (total length) increases in the fastening member 10, the percentage of the length of the fastening force receiving part 10a in the direction of the rotation axis with respect to the total length becomes low. That is, when the percentage of the length of the part of the fastening member 10 (fastening force receiving part 10a) held by the first fitting part 22a of the attachment 22 in the direction of the rotation axis with respect to the total length becomes low in the fastening member 10, the holding of the fastening member 10 by the attachment 22 becomes unstable. Therefore, it becomes highly likely that the fastening member 10 such as a stud bolt whose length in the direction of the rotation axis is a predetermined length or more may drop off from the attachment 22 when the cartridge 2 is moved.

Figure 8:
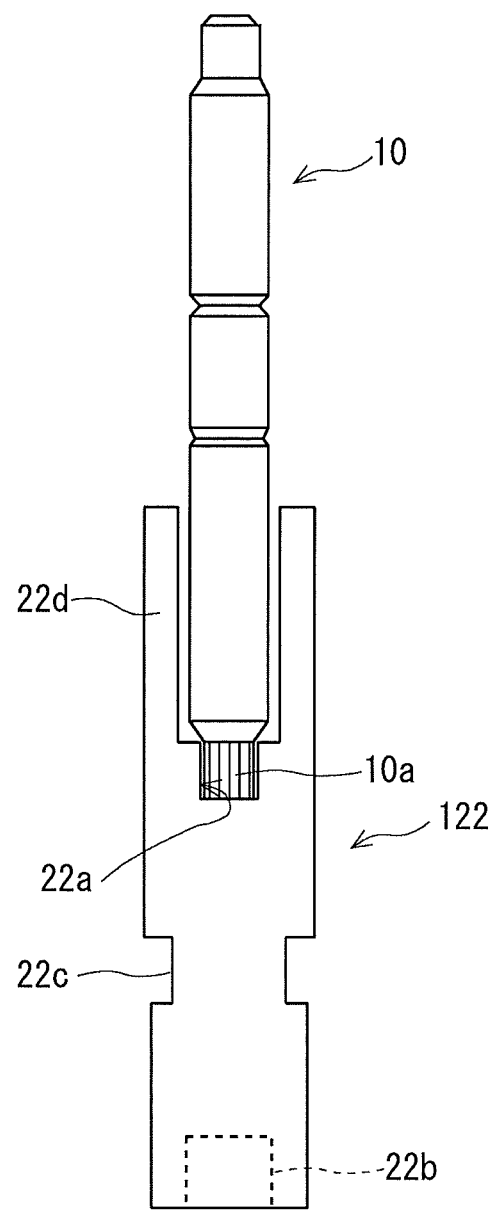
FIG. 8 is a schematic view showing a configuration of an attachment according to a modified example 1.

FIG. 8 is a schematic view showing a configuration of the attachment 22 (attachment 122) according to a modified example 1. The attachment 122 according to the modified example 1 is an element to hold the fastening member 10 such as a stud bolt whose length in the direction of the rotation axis is a predetermined length or more. As shown in FIG. 8, the attachment 122 includes a supporting part 22d that is extended along the direction of the rotation axis in the outer periphery of the fastening member 10 and supports the fastening member 10. According to this structure, it is possible to reduce the possibility that the fastening member 10 may drop off from the attachment 22 when the cartridge 2 is moved.

Modified Example 2

Figure 9:
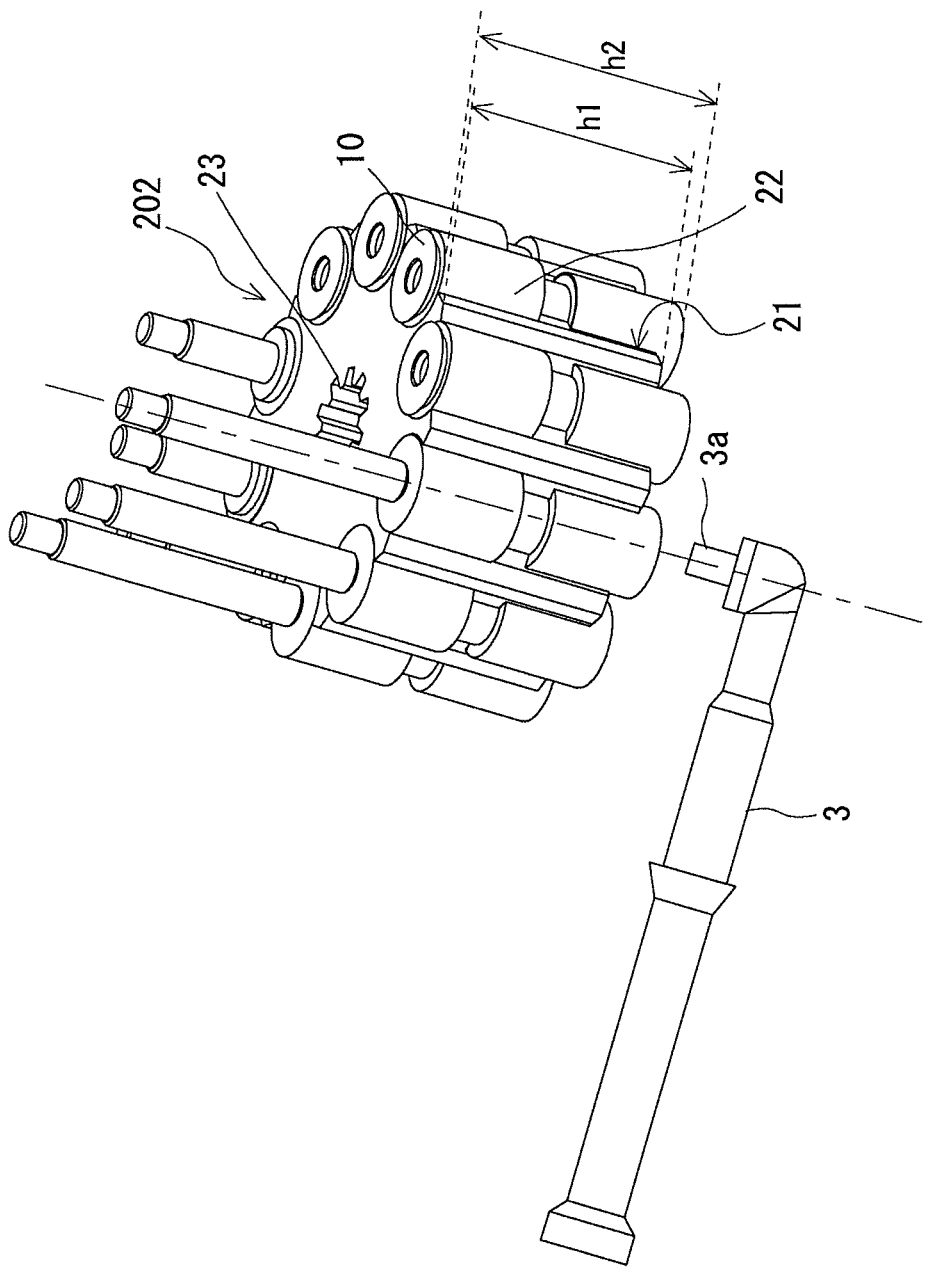
FIG. 9 is a schematic view showing a configuration of a cartridge according to a modified example.

FIG. 9 is a schematic view showing a configuration of the cartridge 2 (cartridge 202) according to a modified example 2. The cartridge 202 according to the modified example 2 is configured in such a way that the height h1 in the axial direction of the main body part becomes substantially equal to the height h2 of the attachment 22. That is, the cartridge 202 is configured in such a way that the fastening members 10 are extruded from the cartridge 202. According to this configuration, when the operator fastens the fastening member 10 using the fastening means 3, the operator needs not remove the attachment 22 that holds the fastening member 10 to be fastened from the cartridge 202. Accordingly, it is possible to improve the operation efficiency in the fastening work. When the cartridge 2 is supplied to the fastening work process, a cover having a hollow columnar shape for covering the cartridge 202 and the plurality of types of fastening members 10 stored in the cartridge 202 may be attached to the outer periphery side of the cartridge 202.

From the aforementioned discussion, in the fastening method according to this embodiment, the cartridge 2 is supplied in the state in which the plurality of types of fastening members 10 and the plurality of attachments 22 are arranged based on the order of fastening the plurality of types of fastening members 10 to the object to be fastened. When the fastening members 10 are arranged in the cartridge 2 as described above, the operator needs not find the fastening members that should be fastened at the predetermined positions of the object to be fastened, whereby it is possible to improve the operation efficiency in the fastening work.

Note that the present disclosure is not limited to the aforementioned embodiment and may be changed as appropriate without departing from the spirit of the present disclosure.

In the aforementioned embodiment, the operator has performed fastening of the fastening members using the cartridge supplied in the state in which the plurality of types of fastening members and the plurality of attachments are arranged based on the order of fastening the plurality of types of fastening members to the object to be fastened. However, this embodiment is not limited to this example and a device, not an operator, may perform fastening of the fastening members.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A fastening method for fastening a plurality of types of fastening members stored in a cartridge at respective predetermined positions in an object to be fastened by rotating the cartridge around a rotation axis of the fastening members, the method comprising:

providing a plurality of attachments for holding the plurality of types of respective fastening members to the cartridge;

fitting a first fitting part of each of the attachments at one end in the direction of the rotation axis to a fastening force receiving part of a corresponding fastening member of the plurality of types of fastening members, a second fitting part of the attachments at another end in the direction of the rotation axis configured to fit to a fastening force working part of a fastening tool;

supplying the cartridge to the object to be fastened in a state in which the plurality of types of fastening members and the plurality of attachments are arranged based on the order of fastening the plurality of types of fastening members to the object to be fastened; and rotating a first attachment of the plurality of attachments by the fastening tool into which the fastening force working part is fit to the second fitting part of the first attachment, the corresponding fastening member in which the fastening force receiving part is fit to the first fitting part of the first attachment rotates along with the rotation of the first attachment.

2. The fastening method according to claim 1, wherein the cartridge has a columnar shape and the plurality of types of fastening members are arranged on a same circumference in an order from a first fastening member whose order of fastening is early to a second fastening member whose order of fastening is late in the cartridge.

3. The fastening method according to claim 1, wherein the order of fastening is determined depending on a type of a vehicle in manufacturing of the vehicle.

4. The fastening method according to claim 1, wherein regarding the order of fastening of the fastening members, the fastening members whose lengths in the direction of the rotation axis are equal to or larger than a predetermined length are prioritized over the fastening members whose lengths in the direction of the rotation axis are smaller than the predetermined length.

5. The fastening method according to claim 1, wherein an attachment of the plurality of attachments for holding the fastening member whose length in the direction of the rotation axis is equal to or larger than a predetermined length is provided with a supporting part that is extended in the direction of the rotation axis in an outer periphery of the fastening member and supports the fastening member.

6. A fastening device for fastening a plurality of types of fastening members to an object to be fastened, comprising:

a cartridge that stores the fastening members at respective predetermined positions; and a plurality of attachments stored in the cartridge to hold the fastening members, each of the attachments including a first fitting part at one end of a respective attachment in the direction of the rotation axis that fits to a fastening force receiving part of a corresponding fastening member of the plurality of types of fastening members, and a second fitting part at another end of the respective attachment in the direction of the rotation axis that fits to a fastening force working part of a fastening tool, wherein the cartridge is supplied to the object to be fastened in a state in which the plurality of types of fastening members and the plurality of attachments are arranged based on an order of fastening, and when a first attachment of the plurality of attachments is rotated by the fastening tool into which the fastening force working part is fit to the second fitting part of the first attachment, a corresponding fastening member in which the fastening force receiving part is fit to the first fitting part of the first attachment rotates along with the rotation of the first attachment.

7. The fastening device according to claim 6, wherein the cartridge has a columnar shape and the plurality of types of fastening members are arranged on a same circumference in an order from a first fastening member whose order of fastening is early to a second fastening member whose order of fastening is late in the cartridge.

8. The fastening device according to claim 6, wherein the order of fastening is determined depending on a type of a vehicle in manufacturing of the vehicle.

9. The fastening device according to claim 6, wherein regarding the order of fastening of the fastening members, the fastening members whose lengths in the direction of the rotation axis are equal to or larger than a predetermined length are prioritized over the fastening members whose lengths in the direction of the rotation axis are smaller than the predetermined length.

10. The fastening device according to claim 6, wherein an attachment of the plurality of attachments for holding the fastening member whose length in the direction of the rotation axis is equal to or larger than a predetermined length is provided with a supporting part that is extended in the direction of the rotation axis in an outer periphery of the fastening member and supports the fastening member.

* * * * *